(12) United States Patent
Good

(10) Patent No.: US 8,033,563 B2
(45) Date of Patent: Oct. 11, 2011

(54) UNIVERSAL PLATFORM HITCH ASSEMBLY SYSTEM

(75) Inventor: Jeffrey Allen Good, Stockton, CA (US)

(73) Assignee: Advanced Engineering Group, Valencia, CA (US)

(*) Notice: Subject to any disclaimer, the term of this patent is extended or adjusted under 35 U.S.C. 154(b) by 321 days.

(21) Appl. No.: 12/128,095

(22) Filed: May 28, 2008

(65) Prior Publication Data

US 2009/0295123 A1    Dec. 3, 2009

(51) Int. Cl.
*B60D 1/50* (2006.01)
(52) U.S. Cl. .............. 280/490.1; 280/416.1; 280/515
(58) Field of Classification Search ............ 280/490.1, 280/416.1, 416.3, 515
See application file for complete search history.

(56) References Cited

U.S. PATENT DOCUMENTS

| | | | | |
|---|---|---|---|---|
| 2,847,232 A * | 8/1958 | Graham | ........ | 280/490.1 |
| 3,664,686 A * | 5/1972 | Anderson | ........ | 280/490.1 |
| 7,029,022 B2 * | 4/2006 | Moss | ........ | 280/491.3 |
| 7,055,845 B1 * | 6/2006 | Putnam | ........ | 280/504 |
| 7,255,362 B2 * | 8/2007 | Smith | ........ | 280/490.1 |
| 7,377,536 B2 * | 5/2008 | Rehme | ........ | 280/483 |
| 2003/0006581 A1 * | 1/2003 | Moss et al. | ........ | 280/416.1 |

* cited by examiner

*Primary Examiner* — Kevin Hurley
(74) *Attorney, Agent, or Firm* — Elizabeth E. Powers

(57) ABSTRACT

A height adjustable hitch assembly. The present invention provides a trailer hitch assembly mountable to a receiver hitch of a vehicle. The trailer hitch assembly includes a vertically extending channel member having opposing side flanges. Each of the side flanges includes equally spaced holes. A locking member having two pins spaced from one another the same distance as the holes in the flanges secures a hitch assembly to the channel member at a desired height. The height can be quickly and easily adjusted by removing the locking member, moving the hitch assembly to the desired height and reinserting the locking member. The channel member and the dual locking pin minimize rocking, swaying and pivoting of the hitch assembly relative to the vehicle.

3 Claims, 6 Drawing Sheets

UNIVERSAL PLATFORM HITCH ASSEMBLY SYSTEM

FIELD OF THE INVENTION

This invention relates to the field of trailer hitch assemblies, and in particular to trailer hitch assemblies are usable with a variety of hitches and that are height adjustable.

BACKGROUND OF THE INVENTION

Trailers have been towed behind vehicles in some form for centuries. Modern trailer towing packages typically include a receiver hitch mounted onto the rear of the vehicle which receives a trailer hitch assembly. These hitch assemblies are typically ball hitches, pintle hitches, pin hitches or other types of trailer hitches. The hitch of the trailer is normally raised over and lowered onto the trailer hitch assembly on the vehicle and locked into place.

One problem with the typical trailer hitch assembly is they are normally usable for only a single purpose. This often requires that an individual keep an inventory of a plurality of hitches for different purposes or for use with different types of trailers as well as heights of trailers.

Another problem with these types of the trailer hitch assemblies is the height of the hitch assembly. There are many different heights of vehicles as well as heights of trailers. Often a trailer will not be level when mounted to vehicle which not only causes issues with the load carried by the trailer but can also create unsafe conditions while towing such a trailer.

Receiver hitch systems are often used for different applications. For example, a receiver hitch may include a trailer towing ball or pintle hitch assembly. Another receiver hitch may be used for mounting a cargo compartment to a vehicle. Another receiver hitch may be used to mount a bicycle carrier to a vehicle. This requires a multitude of different receiver hitch assemblies to be purchased and stored.

There have been several attempts at solving these problems. One such attempt is Quick Hitch manufactured by Action Accessories, Portland, Oreg. Another attempt is the Rapid Hitch, manufactured by Andersen Hitch Division, Idaho Falls, Id. Another attempt is the Tow & Stow by B&W Trailer Hitches, Humboldt, Kans. Those trailer hitches do provide height adjustment and quick change-out, but are still do not solve the problems discussed above.

SUMMARY OF THE INVENTION

The present invention provides a trailer assembly that is easily adjusted to accommodate different types of hitches as well as differences in the height between different vehicle hitches and trailer hitches. The trailer hitch assembly system of this invention will also provide a platform that will allow quick change of receiver hitch systems for different applications. The present invention will be evident from the ensuing detailed description of preferred embodiments and from drawings.

The trailer hitch assembly of a preferred embodiment of the present invention has two outwardly extending flange members. The flange members have multiple holes formed in each flange member that are opposing and equally spaced. The hitch member engages between the flange members to minimize sway between the hitch member and the hitch assembly. A locking pin secures the hitch member to the hitch assembly. The height of the ball on the hitch member can be quickly adjusted by raising or lowering the placement of the hitch member relative to the flanges and reengaging the locking pin.

In another preferred embodiment of the present invention, the hitch assembly has two outwardly extending flange members. The flange members have multiple holes formed in each flange member that are opposing and equally spaced. The hitch member has parallel holes extending through it that are spaced the same distance as the holes in the flange members. The hitch member engages between the flange members A double pin locking member that is U shaped engages in two of the holes in the flange members and through the parallel holes in the flange member to lock the hitch member between the flanges to secure the hitch member and the hitch assembly. The height of the ball on the hitch member can be quickly adjusted by raising or lowering the placement of the hitch member relative to the flanges and reengaging the locking pin.

Different types of hitch members along with different sizes and types of balls mounted on different hitch members can be used with a preferred embodiment of the present invention. This allows quick change out of different hitch members to allow the hitch assembly to be used for different applications.

The system of the present invention also provides a universal platform that will a plurality of different hitch assemblies for different applications to be quickly and easily changed out as needed. For example receiver hitch assemblies for trailer towing, cargo compartments, sports equipment carriers and many others can use a single platform for quick change outs.

Another preferred embodiment of the present invention uses hitch members with several different sizes of hitch balls mounted to it. In one preferred embodiment, the hitch member includes two different sizes of hitch balls mounted in vertical opposition to one another. The hitch member can simply be rotated 180 degrees and reengaged to the flanges to select the other ball.

The hitch assembly of another preferred embodiment of the present invention includes a pintle hook mounted to the hitch member. The pintle hook can be secured over a lunette ring that is mounted over the ball. A locking member locks the pintle hook to prevent accidental disengagement. In a preferred embodiment, the pintle hook also includes a u shaped clamp that secures the locking member from accidental disengagement.

These and other features of the present invention will be evident from the ensuing detailed description of preferred embodiments, from the claims and from the drawings.

BRIEF DESCRIPTION OF THE DRAWINGS

FIG. 13 is a perspective view of another embodiment of an assembled pintle hitch and universal platform.

FIG. 14 is a rear perspective view of the embodiment of FIG. 13.

DETAILED DESCRIPTION OF PREFERRED EMBODIMENTS

Figure 1:
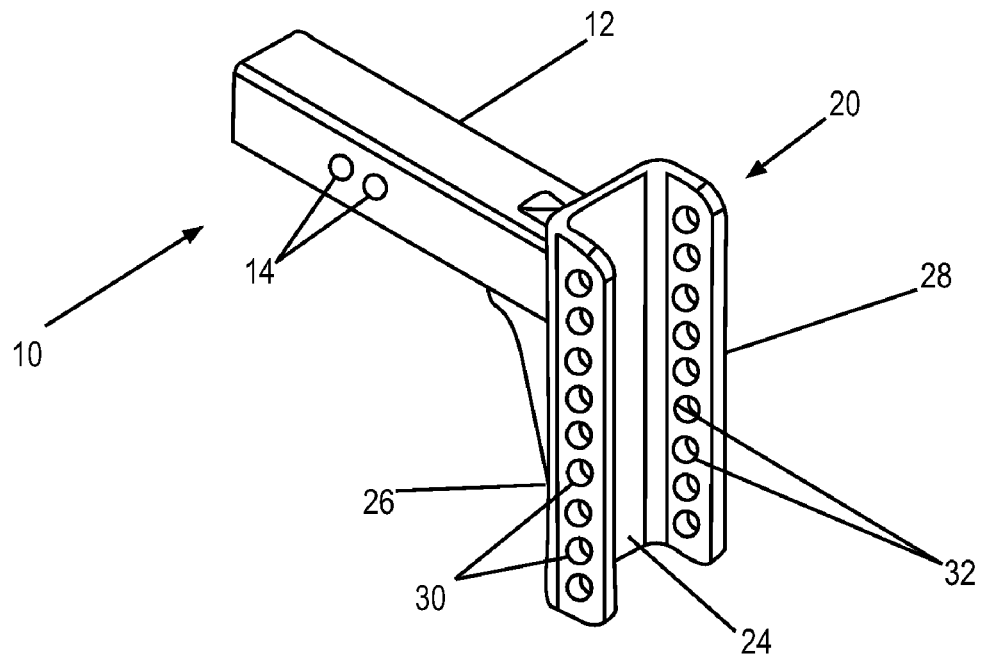
FIG. 1 is a front perspective view of the a universal platform of a preferred embodiment of the present invention.

The present invention provides a height adjustable trailer hitch that will allow a single hitch mounted either directly to a vehicle frame, or in the preferred embodiment, mountable in a vehicle hitch receiver to accommodate a number of heights of trailer hitches. A preferred embodiment of this invention is illustrated in FIGS. 1-14. It is to be expressly understood that the descriptive embodiments are provided herein for explanatory purposes only and are not meant to unduly limit the claimed inventions. The exemplary embodiments describe the present invention in terms of trailer hitches and in particular with a double ball mount hitch system. Other types of trailer hitch assemblies could be used as well including without limitation a single ball mount, a pintle ring hitch system and any other type of trailer hitch assembly as well as other receiver mounted equipment. It is to be understood that the present invention is intended for use with other types of hitches and receiver mounted equipment.

The hitch assembly illustrated in FIGS. 1-12 is a universal platform for use with a variety of different trailer hitches as well as for use with a variety of different receiver mounted accessories. The universal platform system 10 includes a shank 12. The descriptive embodiment illustrated in FIG. 2 includes a shank 12 that is mounted into a vehicle receiver hitch (not shown). The typical size for shank 12 is two inches x two inches, although other sizes may be used as well. The shank 12 includes a locking pin aperture 14. The shank is slid into the vehicle hitch receiver and secured there with a locking pin (not shown) inserted through a hole in the hitch receiver and the shank.

Channel base member 20 is mounted perpendicularly to the shank 12. In this preferred embodiment, the channel base member 20 includes a vertically extending gusset 22 that is mounted into a slot 16 formed in the shank 12. This structure is then welded together to form a rigid high strength structure. It is to be expressly understood that other techniques for attaching channel base member 20 to shank 12 are included under the present invention as well. The entire structure could be machined or forged as an integral unit as well.

Channel member 20 as shown in FIG. 1 includes a U-shaped channel 24 extending vertically between flanges 26, 28 spaced from one another. A plurality of holes 30, 32, are formed in each of the flanges 26, 28 respectively and vertically spaced from one another an equal distance. The number of holes and the height of the channel 24 can be varied under the scope of the present invention.

Figure 2:
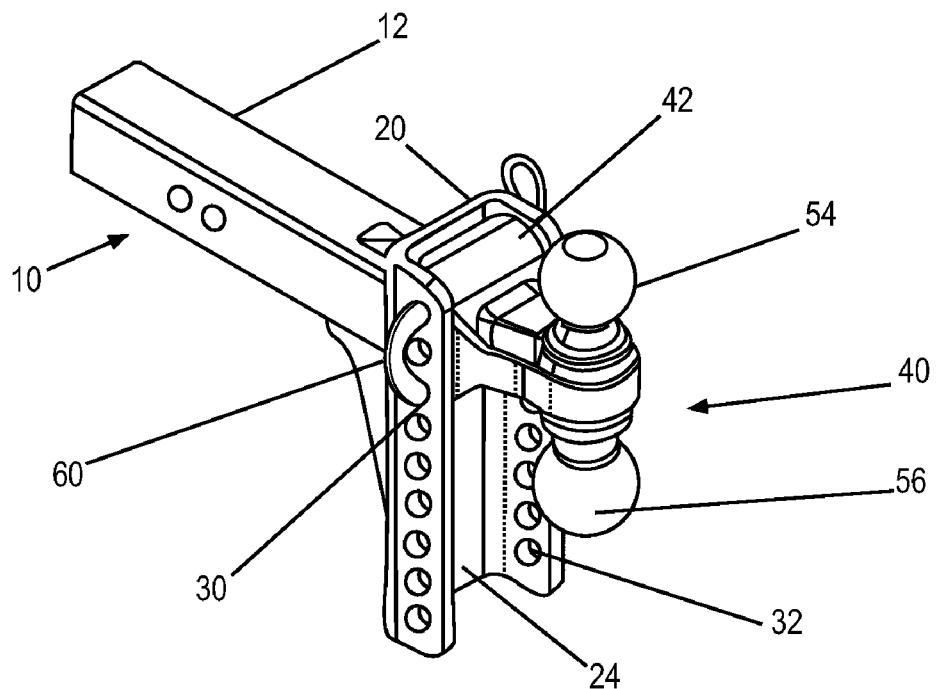
FIG. 2 is a front perspective view of a trailer hitch assembly of a preferred embodiment of the present invention.

The hitch 40 in this preferred embodiment is a double ball mount hitch as shown in FIG. 2. The hitch 40 includes a base member 42 that has a width equal to the width between the flanges 26, 28 of the shank 12. The rear face 44 of the base member 42 also includes two spaced holes 46, 48 that are spaced from one another a distance equal to either the spacing between pairs of the holes in the flanges or a multiple of that spacing. The base member includes a reduced portion 50 that has a hole (not shown) for receiving the shank portion of the double receiver ball member 52. The double receiver ball member 52 includes a first ball 54 that has a first diameter and a second ball 56 that has a different diameter. The first ball 54 and second ball 52 are secured to one another through the hole in the reduced portion 50 of the base member 42. The double mount hitch may be either machined or forged.

Figure 3:
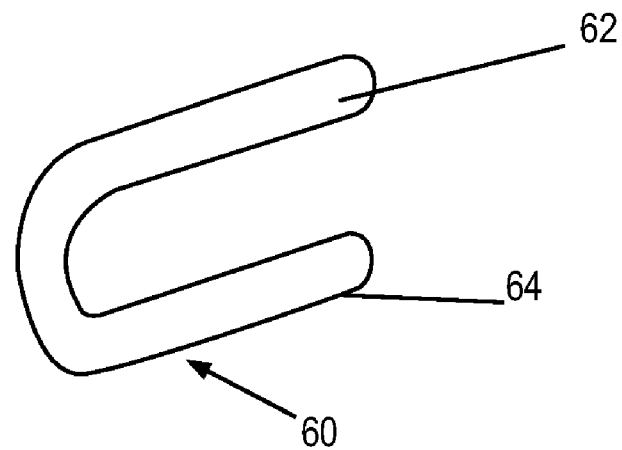
FIG. 3 is a perspective view of a locking member.
Figure 4:
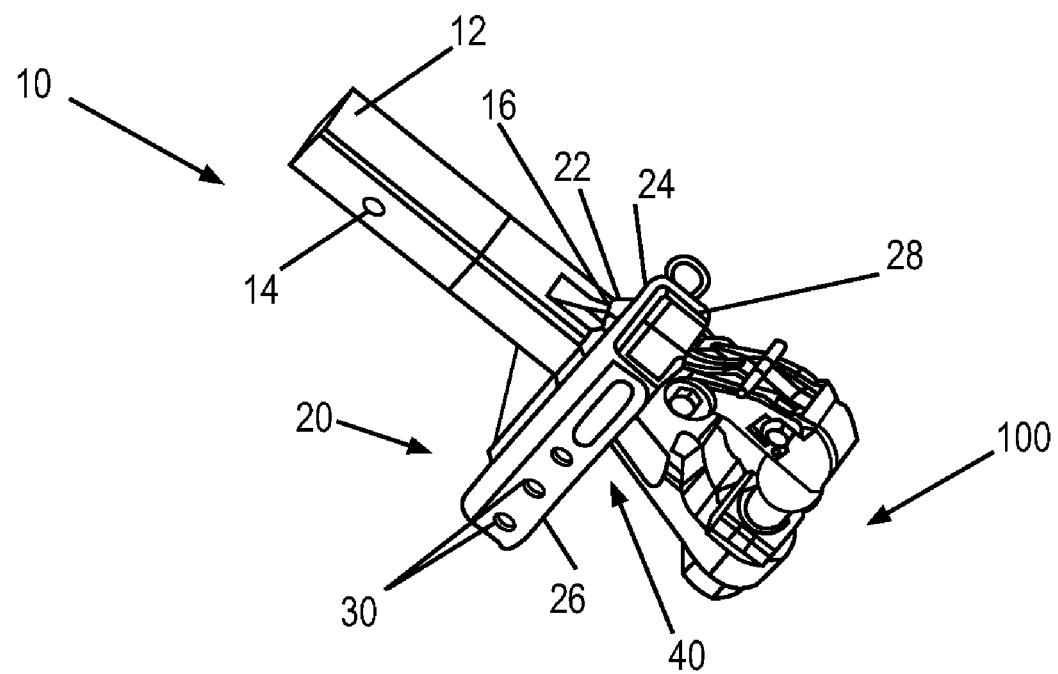
FIG. 4 is a perspective view of a pintle hitch assembly of a preferred embodiment of the present invention.

The trailer hitch system 10 also includes a U-shaped locking member 60 as shown in FIG. 3. The locking member 60 includes two pin portions 62, 64 that are spaced apart from one another the same distance as the spacing between the holes 46, 48 and are approximately the same diameter as the holes 46, 48. Alternatively, two separate pins may be used.

In use, the shank 12 of the universal platform 10 is mounted in the vehicle receiver and locked in place. Then, the assembled hitch 40 is rotated until the desired diameter of either the first ball 54 or the second ball 56 is facing vertically upward. The base member 42 is then inserted between the flanges 26, 28 of the universal platform and moved vertically until the desired height for the ball 54 or ball 56 is reached. The pins 62, 64 of the locking member 60 is then inserted into the nearest holes in the flanges and the holes 46, 48 of the base member aligned with the holes in the flanges. Clips or other locking mechanisms are secured to the ends of the pins 62, 64 to prevent accidental dislodgement of the locking member 60 from the universal platform 10.

The flanges 26, 28 provide an important feature to the hitch assembly by preventing the hitch assembly from swaying from side to side or becoming cocked or otherwise improperly moving. The dual locking members 62, 64 on the locking member 60 also prevent the hitch assembly from pivoting upwards or downwards to provide a more secure attachment.

The height of the balls 54, 56 can be quickly and easily adjusted by simply removing the locking member 60 from the flanges 26, 28 and hitch 40, readjusting the height and reinserting the locking member. Also, the selection of the balls 54, 56 can be changed by simply removing the locking member 60 from the flanges 26, 28 and hitch 40, removing the hitch 40 from between the flanges, rotating the hitch 40 180 degrees, reinserting the base member 42 between the flanges 26, 28 and reinserting the locking member 60 into the aligned holes in the base member and flanges.

The universal platform also allows quick and easy changing from the hitch 40 to another hitch, type of hitch or use of other receiver mounted equipment. The other hitches or receiver mounted equipment will have a base member that is sized similar to the base member 40 of the above embodiment. This allows quick and easy changing from one hitch or equipment to another hitch or equipment.

The universal platform of the present invention also provides a system that allows multiple receiver hitch assemblies to be quickly and easily used. The system of a preferred embodiment allows different receiver hitch assemblies to be directly mounted to the platform. A variety of systems may be mounted to the hitch 40. For example and without limitation, a variety of different sizes of trailer hitch balls, pintle hooks, pintle and ball combinations or clevis mounts may each be mounted to a separate hitch 40. This enables the vehicle to be able to tow different trailers without requiring the entire assembly to be removed and remounted. Also accessory systems may be mounted to the hitch 40, such as a bike rack, cargo carrier, canoe/kayak extension, dog steps (to assist dogs in getting into vehicles), a motorcycle carrier, a scooter lift or any other type of receiver mounted accessory. Other specialty towing systems may be installed on the hitch 40 such as a tow hook or tow bar to tow another vehicle, a weight distributing hitch, or any other type of receiver mounted or towing accessory. Any of these or other type of accessory can be mounted to a hitch 40. This enables a selected towing, accessory or other system to be easily and quickly mounted to a vehicle. The selected hitch is simply inserted between the flanges at the desired height and secured there by the locking pin system 60.

An example of another type of hitch usable with the present system is a pintle style trailer hitch. Pintle hitch systems are popular with heavy duty type trailer applications. A lunette ring (not shown) of a trailer is lowered onto the bottom of the pintle hitch. Once the lunette ring is in place, the top of the pintle hitch closes and locks into place. It is to be expressly understood that the present invention is also usable with standard ball hitch systems as well as any other type of hitch system. It is also to be expressly understood that the present invention is usable with any other type of hitch receiver mounted system.

Figure 5:
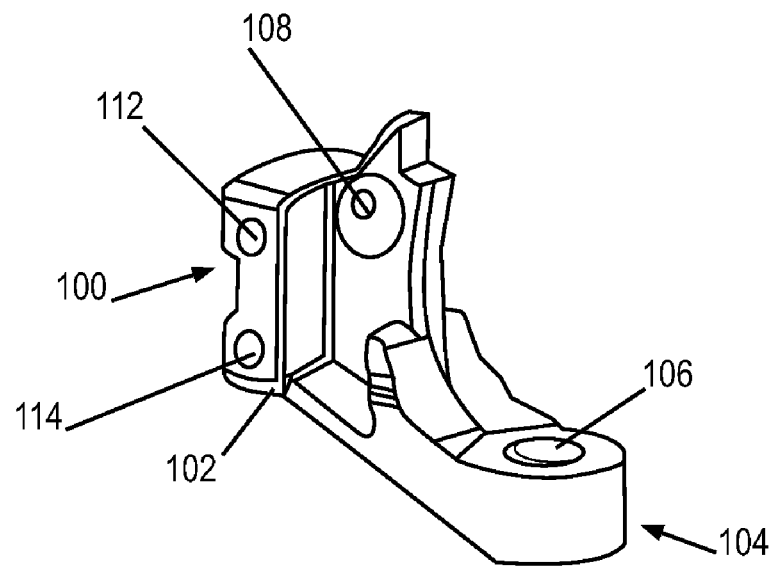
FIG. 5 is a perspective view of the base member of the pintle hitch assembly.
Figure 6:
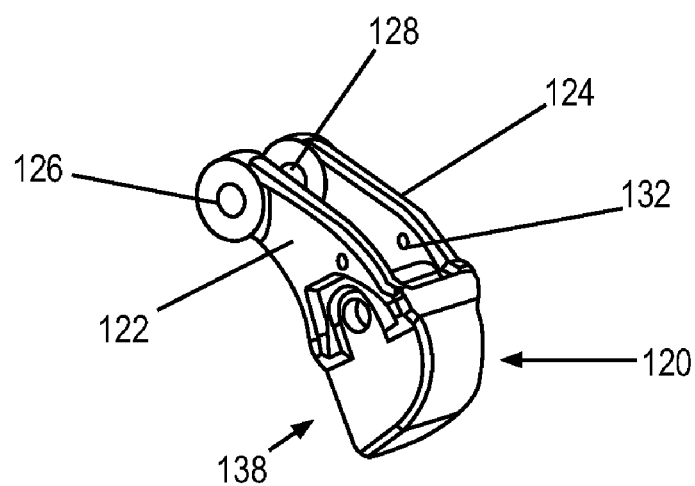
FIG. 6 is a perspective view of a pintle hook.
Figure 7:
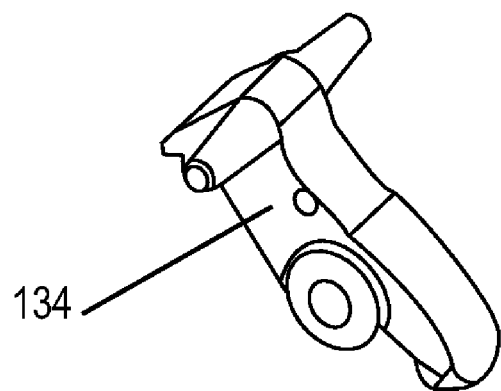
FIG. 7 is a perspective view of a pintle locking member.
Figure 8:
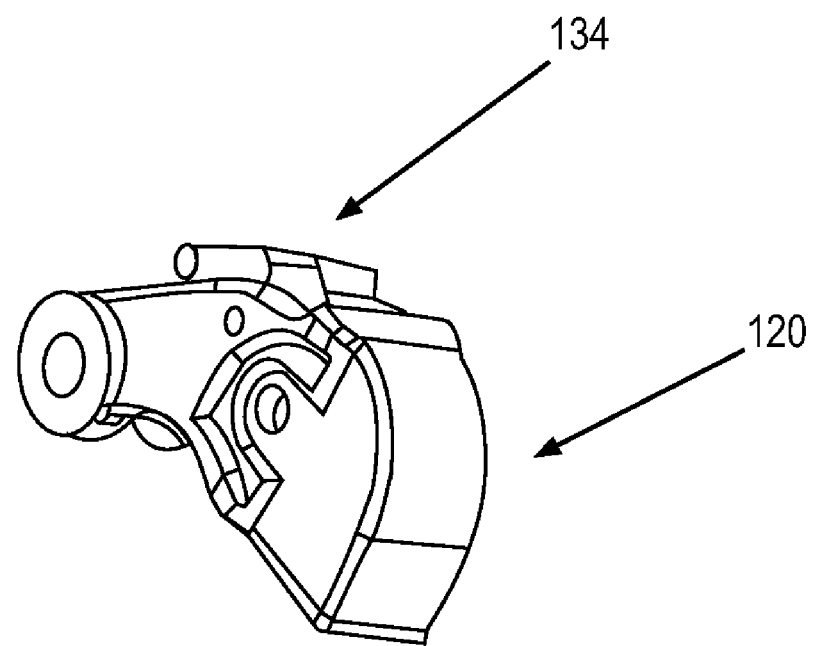
FIG. 8 is a perspective view of the pintle hook of FIG. 6 combined with the pintle locking member of FIG. 7.

An example of a pintle hitch is illustrated in FIG. 5. Pintle body 100 as shown in FIG. 6 is formed from casting or machining. The pintle body 100 includes body member 102 that is received between the flanges 26, 28 of the channel member 20. Aperture 106 is formed in the lower portion 104 of the body member 102 for receiving the shank of a hitch ball shank. Hole 108 is formed in the upper portion 110 of the body member 102 for pivotally securing pintle hook 120 to the body member 102. Holes 112 and 114 are formed in the body member 102 for receiving locking member 60.

Figure 10:
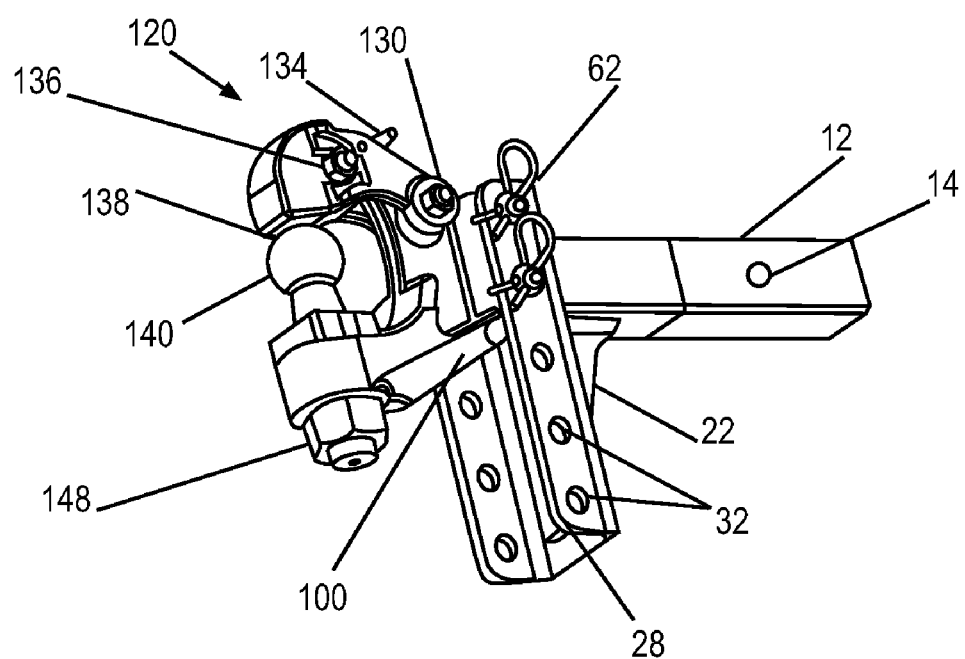
FIG. 10 is a perspective view of the assembled pintle hitch and universal platform.

Pintle hook 120, as shown in FIG. 6, includes two opposing side members 122, 124 with holes 126, 128. The two opposing members 122, 124 engage over upper portion 110 of the body member 102 so that bolt 130 (as shown in FIG. 10) can engage through hole 108 into holes 126, 128 to pivotally secure pintle hook 120 to body member 102. Pintle hook 120 also includes an aperture 132 formed in the upper portion of pintle hook 120. Lever member 134, shown in FIGS. 7 and 8, engages in aperture 132 and is pivotally secured therein by bolt 136 (as shown in FIG. 10). Anvil 138 is formed on the outer end of pintle hook 120.

The pintle hook 120 is mounted to pintle body 100 by bolt 130 so that the pintle hook 120 can pivot relative to the pintle body 100. Lever member 134 is pivoted relative to the pintle hook 120 so that the lower portion of the lever member can engage against the pintle body 120 to prevent accidental disengagement of the pintle hook from the ball member 140.

Figure 9:
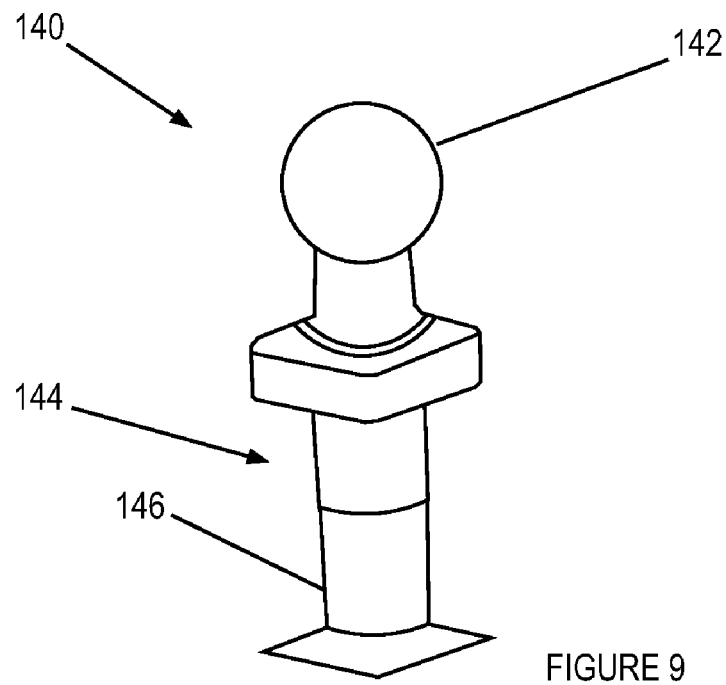
FIG. 9 is a perspective view of the standard ball of the pintle hitch.

A typical ball member 140 is shown in FIG. 9 having a hitch ball 142, shank member 144, threaded portion 146 and threaded nut 148 (shown in FIG. 10). The shank member 144 is inserted into aperture 106 of body member 100 and secured there by nut 148. It is to be expressly understood that other types of ball members may be used as well, particularly multiple ball combinations that provide different sizes of balls on a single hitch.

In use, the assembled pintle hitch 100 is inserted between the flanges 26, 28 of the channel member 20. The pintle hitch 100 is secured there at the desired height by inserting the pin portions 62, 64 of the locking member through adjacent holes 30, 32 of the flanges 26, 28 respectively at the desired height. The locking pins 62, 64 can be secured there by clips, locks or other securing mechanisms.

The lunette ring of the trailer can then be lowered onto the ball 142 until it is level and fully engages the ball 142. The pintle hook 120 is then pivoted downward until the anvil 138 is adjacent or engages the ball 142. The locking lever 134 is then pivoted forward to lock the pintle hook 120 in place from accidental disengagement.

Figure 11:
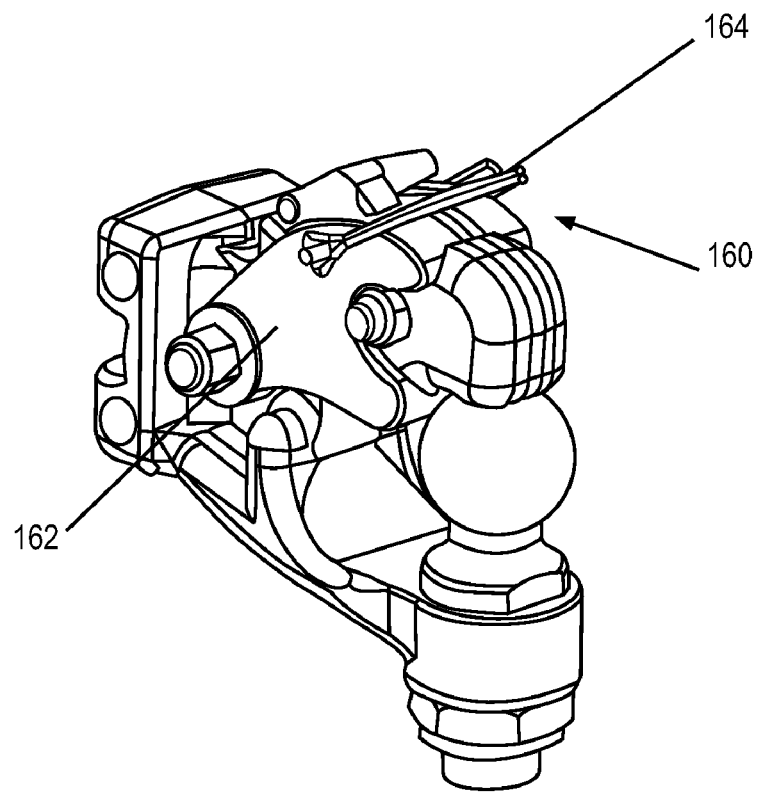
FIG. 11 is a perspective view of another embodiment of an assembled pintle hitch and universal platform.
Figure 12:
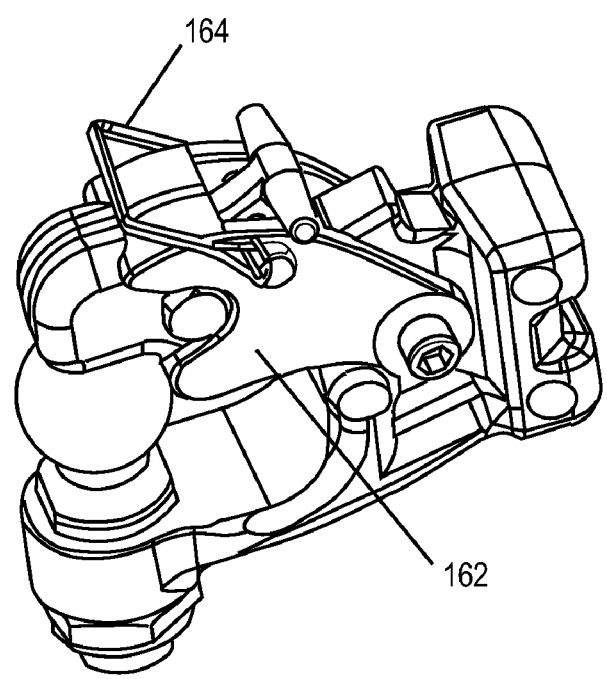
FIG. 12 is a rear perspective view of the embodiment of FIG. 11.

An alternative embodiment of the pintle hitch 100 is illustrated in FIGS. 11 and 12. This embodiment uses a clamping member 160 to secure the locking lever 134 from accidental dislodgement. The clamping member 160 includes U-shaped member 164 which is pulled forward to secure clamp 162 about the locking lever 134.

It is once again to be expressly understood that other types of trailer hitch mechanisms can be used including without limitation standard ball hitches, clevis hitches and others.

The height of the hitch assembly 50 can be quickly and easily adjusted to accommodate a differing height of trailer which often occurs. The locking member 60 is simply pulled from the flanges 26, 28, the hitch assembly 100 is lowered or raised to the nearest desired height and the pin portions of the locking member are reinserted.

The flanges 26, 28 provide an important feature to the hitch assembly by securing the hitch to the platform securely and without being coming cocked or otherwise improperly moving. The dual locking members 62, 64 on the locking member 60 also prevent the hitch assembly from pivoting upwards or downwards to provide a more secure attachment.

These and other features are considered to be within the scope of the present invention as disclosed and as would be evident from the descriptive embodiments and from the drawings, taken either singly or in combination with one another.

What is claimed is:

1. A height adjustable trailer hitch assembly wherein said height adjustable trailer hitch assembly comprises:
   a mechanism for securing the trailer hitch assembly to a vehicle;
   a vertically extending channel member having two outwardly extending flange members;
   at least two equally spaced holes formed in each of said flange members;
   a trailer hitch member; and
   a locking member for securing said trailer hitch assembly to said channel member; and
   wherein said trailer hitch member further includes:
   a pintle hook for securing a lunette ring over said hitch ball on said trailer hitch member;
   a locking member for locking said pintle hook; and
   a U shaped clamp for securing said locking member from accidental disengagement.

2. A height adjustable trailer hitch assembly wherein said height adjustable trailer hitch assembly comprises:
   a mechanism for securing the trailer hitch assembly to a vehicle;
   a vertically extending channel member having two outwardly extending flange members; a plurality of holes formed in each of said outwardly extending flange members spaced equally from one another and opposing one another;
   a trailer hitch member; and
   a locking member having two pins spaced from one another an equal distance as the spacing between said equally spaced holes in said flange members for securing said trailer hitch assembly to said channel member; and
   wherein said trailer hitch member further includes:
   a pintle hook for securing a lunette ring over said hitch ball on said trailer hitch member; a locking member for locking said pintle hook; and
   a U shaped clamp for securing said locking member from accidental disengagement.

3. A height adjustable trailer hitch assembly wherein said height adjustable trailer hitch assembly comprises:
   a mechanism for securing the trailer hitch assembly to a vehicle;

a vertically extending channel member having two outwardly extending flange members; a plurality of equally spaced holes formed in each of said flange members;

a trailer hitch member that engages between said outwardly extending flange members; and a locking member having two pins spaced from one another an equal distance as the spacing between said equally spaced holes in said flange members for securing said trailer hitch assembly to said channel member; and wherein said trailer hitch member further includes:

a pintle hook for securing a lunette ring over said hitch ball on said trailer hitch member;

a locking member for locking said pintle hook; and a U shaped clamp for securing said locking member from accidental disengagement.

* * * * *